(12) United States Patent
Koga et al.

(10) Patent No.: US 7,391,464 B2
(45) Date of Patent: Jun. 24, 2008

(54) CAMERA UNIT FOR DRIVING LENSES AND METHOD OF MANUFACTURING THE SAME

(75) Inventors: Akihiro Koga, Kawasaki (JP); Toshikatsu Akiba, Kisarazu (JP); Yasuo Shima, Kawasaki (JP); Hiroyuki Kayano, Fujisawa (JP); Makoto Aoki, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 750 days.

(21) Appl. No.: 10/672,434

(22) Filed: Sep. 29, 2003

(65) Prior Publication Data
US 2004/0130639 A1 Jul. 8, 2004

(30) Foreign Application Priority Data
Sep. 30, 2002 (JP) ............... 2002-287869

(51) Int. Cl.
*H04N 5/232* (2006.01)
*G03B 13/00* (2006.01)
*H04N 5/225* (2006.01)
*G03B 17/00* (2006.01)

(52) U.S. Cl. .................. 348/357; 348/374; 396/75
(58) Field of Classification Search .......... 348/374, 348/340, 357; 396/75
See application file for complete search history.

(56) References Cited

U.S. PATENT DOCUMENTS

| 6,611,079 B2 | 8/2003 | Koga et al. |
| 2002/0036443 A1* | 3/2002 | Akiba et al. ............... 310/309 |
| 2004/0130639 A1 | 7/2004 | Koga et al. |

FOREIGN PATENT DOCUMENTS

| EP | 1 193 853 | 4/2002 |
| EP | 1 202 099 | 5/2002 |
| JP | 63-214732 | 9/1988 |
| JP | 2001-69383 | 3/2001 |
| JP | 2002-199747 | 7/2002 |

(Continued)

OTHER PUBLICATIONS

A. Koga, et al., IEEE, Journal of Lightwave Technology, vol. 17, No. 1, pp. 43-47, "Electrostatic Linear Microactuator Mechanism for Focusing a CCD Camera", Jan. 1999.

(Continued)

*Primary Examiner*—Lin Ye
*Assistant Examiner*—Kelly L Jerabek
(74) *Attorney, Agent, or Firm*—Oblon, Spivak, McClelland, Maier & Neustadt, P.C.

(57) ABSTRACT

A camera unit includes a soft substrate on which electrode regions and an image pickup device region are disposed, a driving electrode group disposed on one of the electrode regions, an image pickup device disposed on the image pickup device region, stationary unit frame attaching portions disposed at positions surrounding the image pickup device region, a stationary unit frame attached to the stationary unit frame attaching portions, and movable units disposed in the stationary unit frame. The soft substrate is bent along bending positions between the electrode regions and the image pickup device region, the electrode regions are fixed on sides of the stationary unit frame inwardly thereof, and the image pickup device region is fixed on an end surface of the stationary unit frame toward the movable units.

6 Claims, 7 Drawing Sheets

FOREIGN PATENT DOCUMENTS

WO      WO 01/06563      1/2001

OTHER PUBLICATIONS

U.S. Appl. No. 09/818,840, filed Mar. 28, 2001, Kasahara et al.
U.S. Appl. No. 09/963,424, filed Sep. 27, 2001, Akiba et al.
U.S. Appl. No. 10/243,677, filed Sep. 16, 2002, Koga et al.
U.S. Appl. No. 10/299,662, filed Nov. 20, 2002, Koga et al.
U.S. Appl. No. 10/327,907, filed Dec. 26, 2002, Akiba et al.
U.S. Appl. No. 10/668,157, filed Sep. 24, 2003, Yoshida et al.
U.S. Appl. No. 10/672,434, filed Sep. 29, 2003, Koga et al.
U.S. Appl. No. 10/672,409, filed Sep. 29, 2003, Koga et al.
U.S. Appl. No. 10/950,449, filed Sep. 28, 2004, Yoshida.
U.S. Appl. No. 10/950,421, filed Sep. 28, 2004, Yoshida.
U.S. Appl. No. 11/224,232, filed Sep. 13, 2005, Sekimura.
U.S. Appl. No. 11/230,491, filed Sep. 21, 2005, Akiba et al.
U.S. Appl. No. 11/230,488, filed Sep. 21, 2005, Koga et al.
U.S. Appl. No. 11/233,091, filed Sep. 23, 2005, Koga et al.
U.S. Appl. No. 11/377,191, filed Mar. 17, 2006, Akiba et al.

* cited by examiner

PRIOR ART

CAMERA UNIT FOR DRIVING LENSES AND METHOD OF MANUFACTURING THE SAME

CROSS-REFERENCE TO RELATED APPLICATIONS

This application is based upon and claims the benefit of priority from the prior Japanese Patent Application No. 2002-287869, filed Sep. 30, 2002, the entire contents of which are incorporated herein by reference.

BACKGROUND OF THE INVENTION

1. Field of the Invention

The present invention relates to a camera unit for driving lenses by an electrostatic actuator and to a method of manufacturing the camera unit, and more particularly to a camera unit and a method of manufacturing the same by which an assembling accuracy can be improved.

2. Description of the Related Art

There are camera units using an electrostatic actuator as a small actuator. In this camera unit, an image pickup device is mounted on a substrate as well as a stator of the electrostatic actuator is attached to the substrate through a lens holder.

Figure 10:
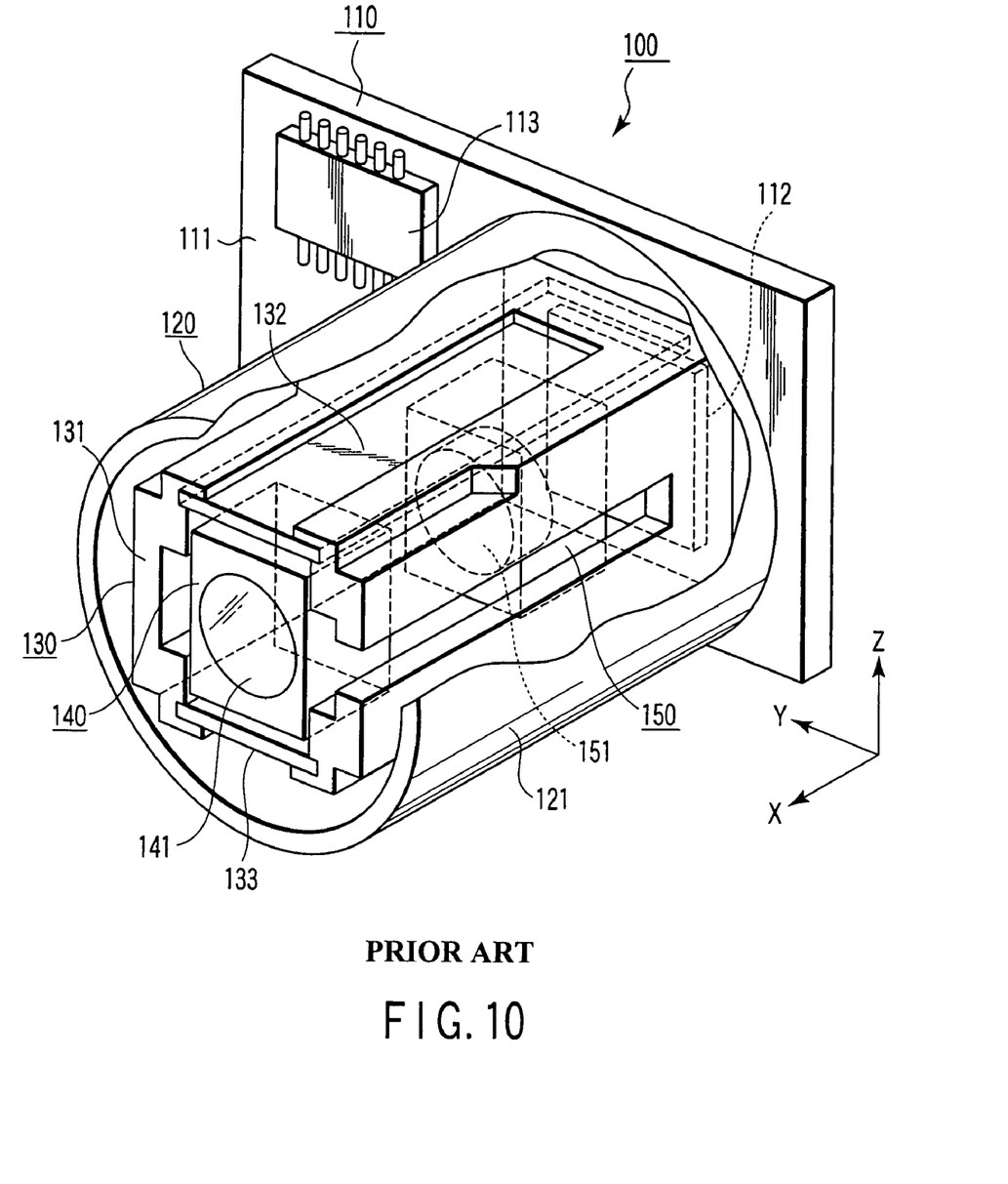
FIG. 10 is a perspective view, partly in cross section, of a conventional camera unit.
Figure 11:
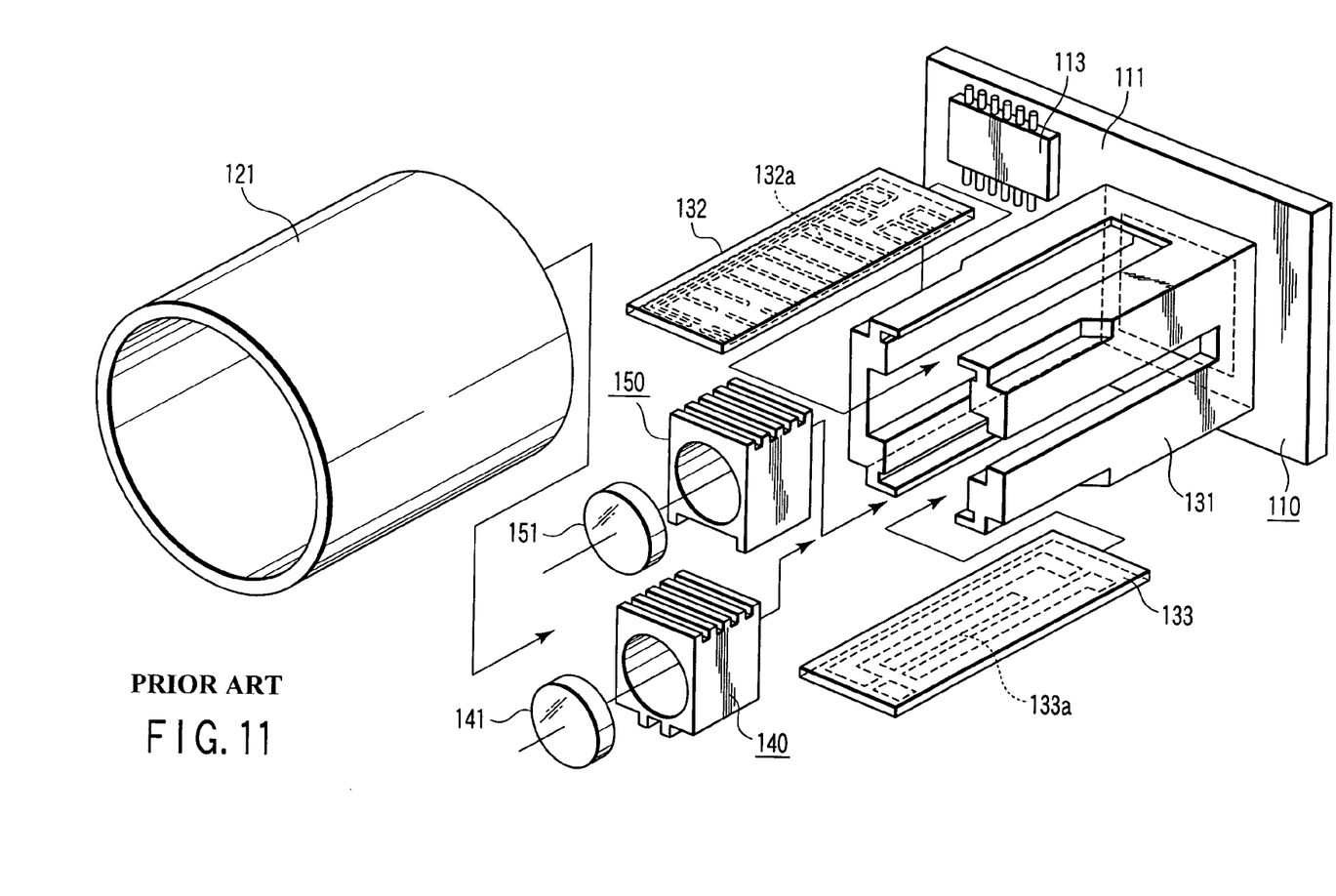
FIG. 11 is an exploded perspective view of the camera unit.

FIG. 10 is a perspective view, partly in cross section, of an ordinary camera unit 100, and FIG. 11 is an exploded perspective view showing the camera unit 100. In these figures, arrows X, Y, Z show three directions perpendicular to each other, and, in particular, the arrow X shows the moving direction of first and second movable units 140 and 150.

The camera unit 100 includes an image pickup device unit 110 and a zoom lens unit 120. The image pickup device unit 110 includes a substrate 111, and a sensor 112 such as a CCD or the like and an electronic part 113 such as a switching device or the like, which are disposed on the substrate 111.

The zoom lens unit 120 includes a cylindrical cover 121, a stationary unit 130, a first movable unit 140, and a second movable unit 150. The first and second movable units 140 and 150 are inserted into a stationary unit frame 131 (which will be described later) such that they can be moved along an optical direction C while being separated from each other.

The stationary unit 130 includes the stationary unit frame 131 composed of a hollow frame member having a passing-though portion and formed in a cuboid shape. Attached to the stationary unit frame 131 are a driving electrode substrate 132 for driving the first and second movable units 140 and 150 and a holding electrode substrate 133 for holding the first and second movable units 140 and 150 at the positions thereof. An electrostatic actuator is composed of the stationary unit 130 and the movable units 140 and 150.

Stationary unit electrodes 132a and 133a each composed of a plurality of electrodes are formed on the surfaces of the driving electrode substrate 132 and the holding electrode substrate 133, respectively and execute driving operation or a holding operation in response to a signal from the electronic part 113. At the time, a voltage applied to the stationary unit electrodes 132a and 133a has a relatively high voltage level of at least 100 V. This is because since the force generated by the electrostatic actuator is proportional to the square of an applied voltage, a high voltage is necessary to generate a large force. The voltage applied to the stationary unit electrodes 132a and 133a is created by boosting a low voltage (for example, 1.5 V, 1.8 V, 2.5 V, etc.).

The thus created high voltage is formed in voltage waveform patterns with respect to channels as many as the plurality of electrodes of the stationary unit electrode by the electronic part 113 disposed on the substrate 111 of the camera unit 100, each of the voltage waveform patterns being predetermined as to each of the channels. The thus formed voltage waveforms are applied between the stationary unit electrodes 132a and 133a of the stationary unit 130 and the first and second movable units 140 and 150, and the first and second movable units 140 and 150 are driven by an electrostatic attracting force (coulomb force) generated between both the electrodes.

The camera unit using the electrostatic actuator described above has the following problems. That is, when the camera unit is composed of the electrostatic actuator and the image pickup device, the electrostatic actuator is attached to the image pickup device through an actuator attachment holder in many cases. In this case, when a lens holder is attached to a substrate with a bad accuracy, the image pickup device becomes misaligned with the optical axis of a movable lens in the actuator. Accordingly, a problem arises in that image quality is deteriorated. Otherwise, since the electrostatic actuator is attached to the image pickup device through the actuator attachment holder, the image pickup device and the electrostatic actuator cannot be effectively disposed. Further, a problem also arises in that productivity is decreased by an increase in the number of assembly processes.

In contrast, when the electrostatic actuator is simultaneously used together with another electronic device, a problem arises in that electro magnetic interference (EMI) occurs. That is, this is a problem of radiation noise generated from a circuit portion located forward of a switching device because the waveform patterns are created from the high voltage supplied to the electrostatic actuator. Counter-measures often employed to solve this problem are to insert a capacitor for lowering the peak of the noise or to shield a source, which is assumed to generate noise, with a metal. However, these countermeasures are time consuming and increase cost and further prevent reduction in size of the camera unit.

The camera unit may be mounted on a mobile phone, PDA, and the like, and, in this case, the space in which the camera is installed may be strictly restricted. Since there is an increasing demand for a small camera unit, a technology for reducing the size of a camera unit is a very important. Note that there is known a technology for reducing the thickness of a camera unit by mounting an image pickup device on an FPC member (refer to public documents 1 and 2).

SUMMARY OF THE INVENTION

In view of the above problems, an object of the present invention is to provide a camera unit and a method of manufacturing the camera unit capable of accurately executing an optical adjustment in assembly and reducing the size of the camera unit by decreasing the number of parts. Another object of the present invention is to provide a camera unit capable of easily reducing radiation noise without increasing the number of parts.

To solve the above problems and to achieve the above object, a camera unit and a method of manufacturing the camera unit of the present invention are arranged as described below.

A camera unit according to the present invention comprises a flexibile substrate including at least an electrode region and an image pickup device region formed on the same surface thereof; a driving electrode portion disposed on the electrode region and including a plurality of electrodes arranged along a predetermined direction; an image pickup device disposed on the image pickup device region; stationary unit attaching portions disposed at positions surrounding the image pickup device region; a stationary unit frame which is attached to the stationary unit attaching portions and extended in the predetermined direction; and movable units which are reciprocatingly driven in the stationary unit frame in the predetermined direction by the driving electrode portion and support a lens respectively, wherein the flexibile substrate is bent along a bending portion between the electrode region and the image pickup device region, the electrode region is fixed on a side of the stationary unit frame inwardly thereof, and the image pickup device region is fixed on an end surface of the stationary unit frame toward the movable units.

In a method of manufacturing the camera unit according to the present invention comprising a stationary unit and movable units reciprocatingly driven in the stationary unit along a predetermined direction and supporting a lens respectively, the stationary unit comprising a flexibile substrate including at least an electrode region, on which a driving electrode portion is mounted, and an image pickup device region, on which an image pickup device and a stationary unit frame are mounted, on the same surface thereof, the method comprises: attaching the stationary unit frame to the image pickup device region; bending the flexibile substrate along a bending portion between the electrode region and the image pickup device region; fixing the electrode region to a side of the stationary unit frame inwardly thereof; and fixing the image pickup device region on the end surface of the stationary unit frame toward the movable units.

In another method of manufacturing of a camera unit according to the present invention comprising a stationary unit and movable units which are reciprocatingly driven in the stationary unit along a predetermined direction and support a lens, the stationary unit comprising a flexibile substrate including at least an electrode region, on which a driving electrode portion is mounted, an image pickup device region, on which an image pickup device and a stationary unit frame are mounted, and a switching device region, on which a switching device is mounted, on the same surface thereof, the method comprises: attaching the stationary unit frame to the image pickup device region; bending the soft substrate along a bending portion between the electrode region and the image pickup device region; bending the flexibile substrate along a bending portion between the electrode region and the switching device region; fixing the electrode region to a side of the stationary unit frame inwardly thereof; fixing the image pickup device region on an end surface of the stationary unit frame toward the movable units; and fixing the switching device region on the end surface of the stationary unit frame toward the movable units.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

Figure 1A:
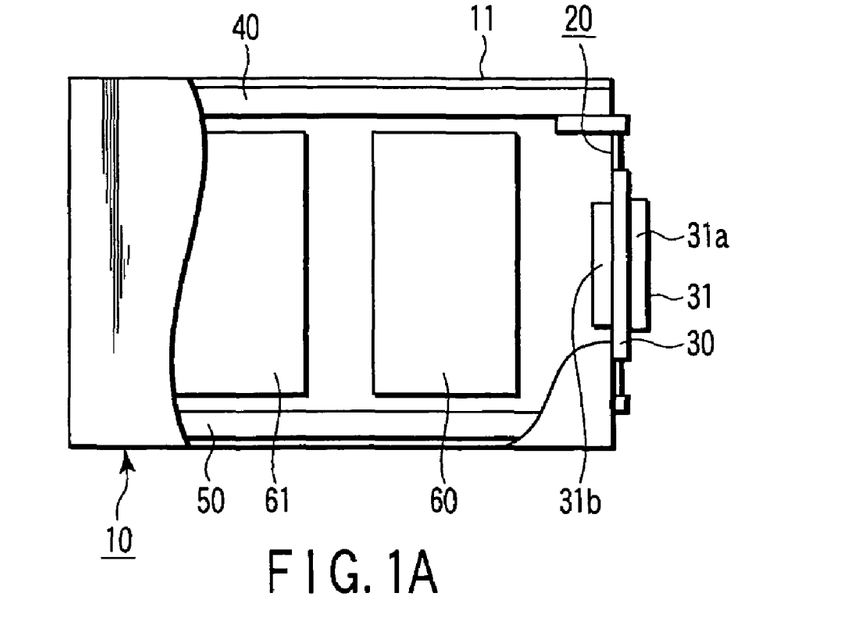
FIGS. 1A and 1B are partially cutaway side elevational views of a camera unit according to a first embodiment of the present invention.
Figure 1B:
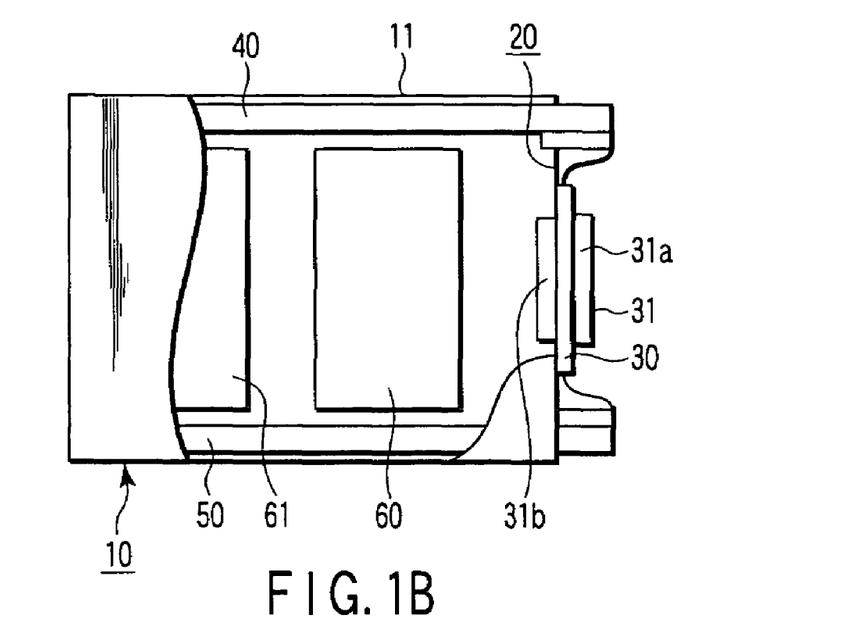
Figure 2A:
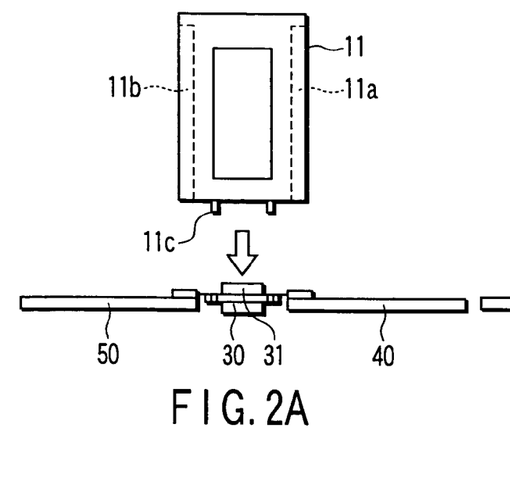
FIGS. 2A to 2D are side elevational views showing processes of assembling the camera unit.
Figure 2B:
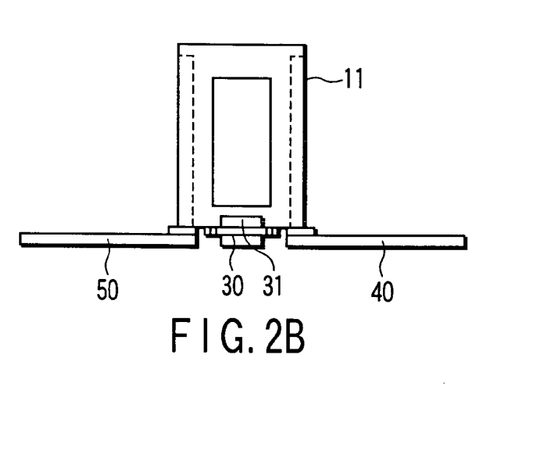
Figure 2C:
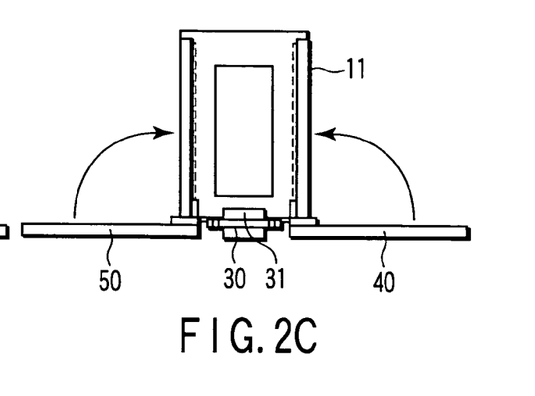
Figure 2D:
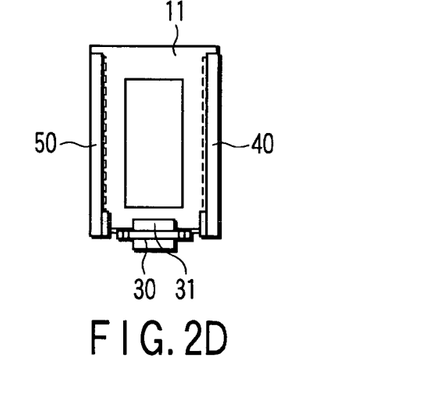
Figure 3:
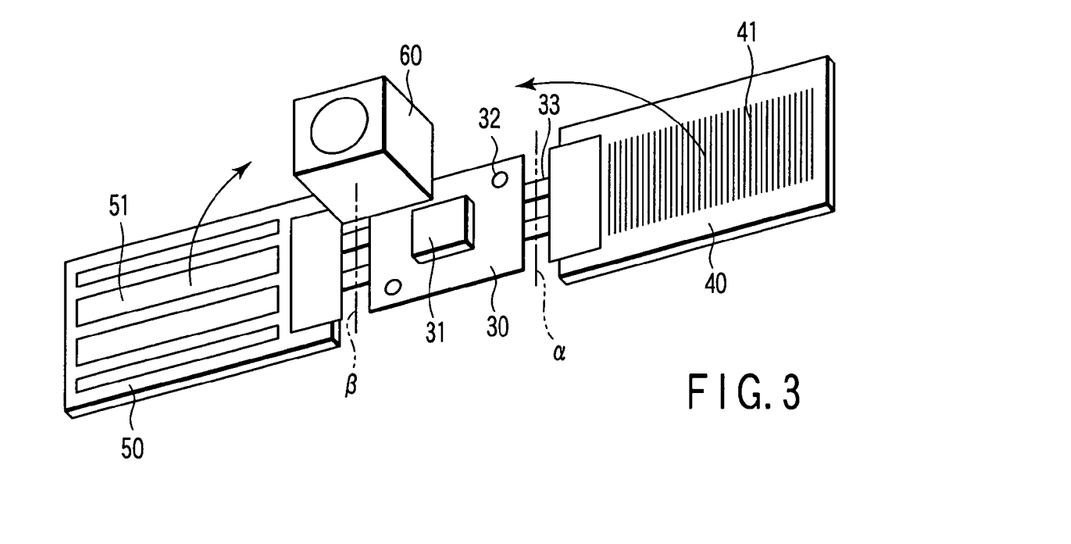
FIG. 3 is a perspective view showing a soft substrate and a movable unit assembled in the camera unit.

FIGS. 1A and 1B are partially cutaway side elevational views of a camera unit 10 according to a first embodiment of the present invention, FIGS. 2A to 2D are side elevational views showing processes of assembling the camera unit 10, and FIG. 3 is a perspective view showing a soft substrate 20 and a movable unit 30.

The camera unit 10 has a square-cylindrical stationary unit frame 11. Attachment portions 11a and 11b, to which electrode regions 40 and 50 to be described later are attached, are formed on sides of the stationary unit frame 11. In contrast, projections 11c, which are attached to stationary unit attaching portions 32 to be described later, are formed in an opening of the stationary unit frame 11.

In FIG. 1, reference numeral 20 denotes the film-like soft substrate. As shown in FIG. 3, the soft substrate 20 composed of a flexible printed circuit board (FPC) includes a square image pickup device region 30 and the pair of electrode regions 40 and 50 disposed on both the sides of the image pickup device region 30. An image pickup device 31 and the stationary unit frame attaching portions 32, to which the stationary part frame 11 is attached, are formed in the image pickup device region 30. The image pickup device 31 is composed of a sensor chip 31a and a cover glass 31b and arranged so as to sandwich the soft substrate 20 therebetween.

A driving electrode group 41 is formed in the electrode region 40, and a holding electrode group 51 is formed in the electrode region 50. Further, flying leads 33, from which a mother member is removed to expose only copper wires, are interposed between the image pickup device region 30, the electrode region 40 and the electrode region 50 so that they can be easily bent. Note that α and β in FIG. 3 show bending positions. Further, reference numeral 60 and 61 in FIG. 1 denote movable units reciprocatingly disposed in the stationary unit frame 11. These movable units 60 and 61 contain lens groups which are disposed so as to be imaged on the image pickup device 31 described above.

The camera unit 10 described above is manufactured as described below. That is, as shown in FIG. 2A, the soft substrate 20 before it is bent and the stationary unit frame 11 are prepared. Next, as shown in FIG. 2B, the projections 11c of the stationary unit frame 11 are attached to the stationary unit frame attaching portions 32 of the soft substrate 20.

Next, as shown in FIG. 2C, the soft substrate 20 is bent at the predetermined bending positions α and β. Note that when the soft substrate 20 is bent, the relative position between the driving electrode group 41 of the electrode region 40 and the holding electrode group 51 of the electrode region 50 may be ordinarily displaced by a reaction force. However, since only the flying leads 33 are disposed at the bending positions α and β, generation of the reaction force is restricted. Next, as shown in FIG. 2D, the electrode regions 40 and 50 are fixed to the attaching portions 11a and 11b of the stationary unit frame 11. Further, the image pickup device region 30 is aligned.

When the camera unit 10 is arranged as described above, since it is possible to form the image pickup device 31, the driving electrode group 41, and the holding electrode group 51 on the single soft substrate 20, the image pickup device 31, the driving electrode group 41 and the holding electrode group 51 can be aligned with each other with a pinpoint accuracy. Accordingly, since parts such as an attaching holder and the like are not necessary, it can be prevented that an image is deteriorated by an attaching holder attached to the substrate with a bad attachment accuracy. Further, a decrease in the number of parts can reduce a manufacturing cost and an assembly cost as well as the size of the camera unit can be reduced. Moreover, even if the position of the image pickup device 31 is changed by a change of design of the camera unit 10, it can be flexibly coped with by appropriately moving the bending positions α and β, by which a freedom of design can be increased.

As described above, according to the camera unit 10 of the embodiment, an optical adjustment can be executed accurately in assembly as well as the size of the camera unit can be reduced by decreasing the number of parts.

Figure 4:
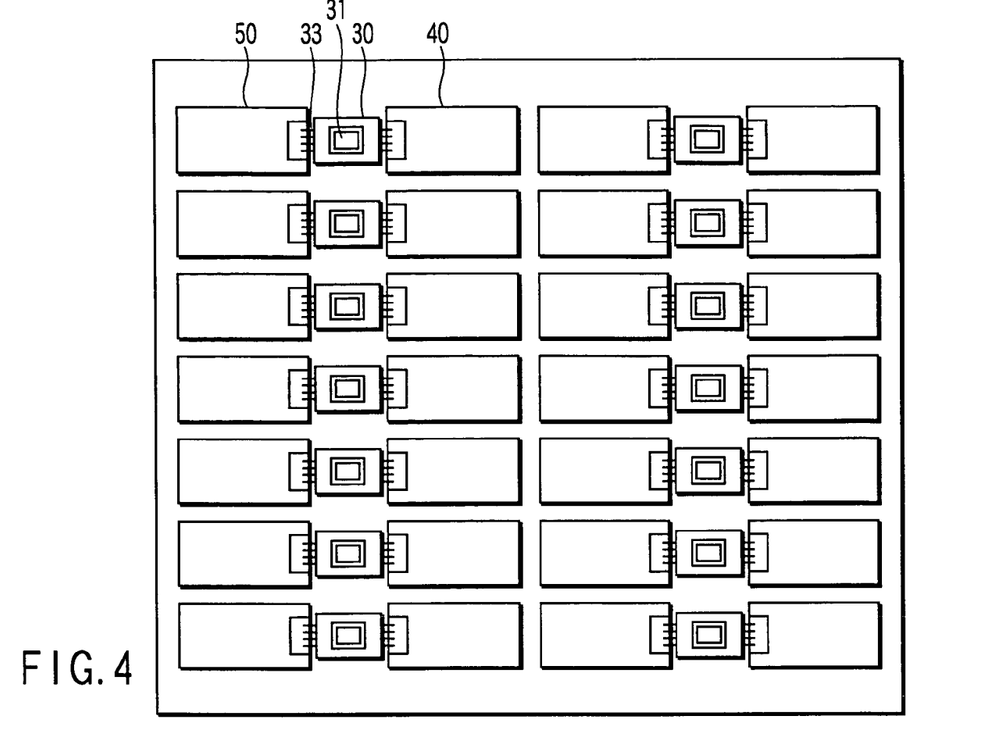
FIG. 4 is a plan view showing a method of manufacturing the soft substrate.

FIG. 4 is a view showing an example of a method of manufacturing the soft substrate 20. The image pickup device 31, driving electrode groups 41 and holding electrode groups 51 are formed on an FPC member using a tape carrier package (TCP) technology. Next, they are connected to each other using an anisotropic conductive film (ACF) technology and an anisotropic conductive paste (ACP) technology, and then extra mother members are cut off.

Figure 5:
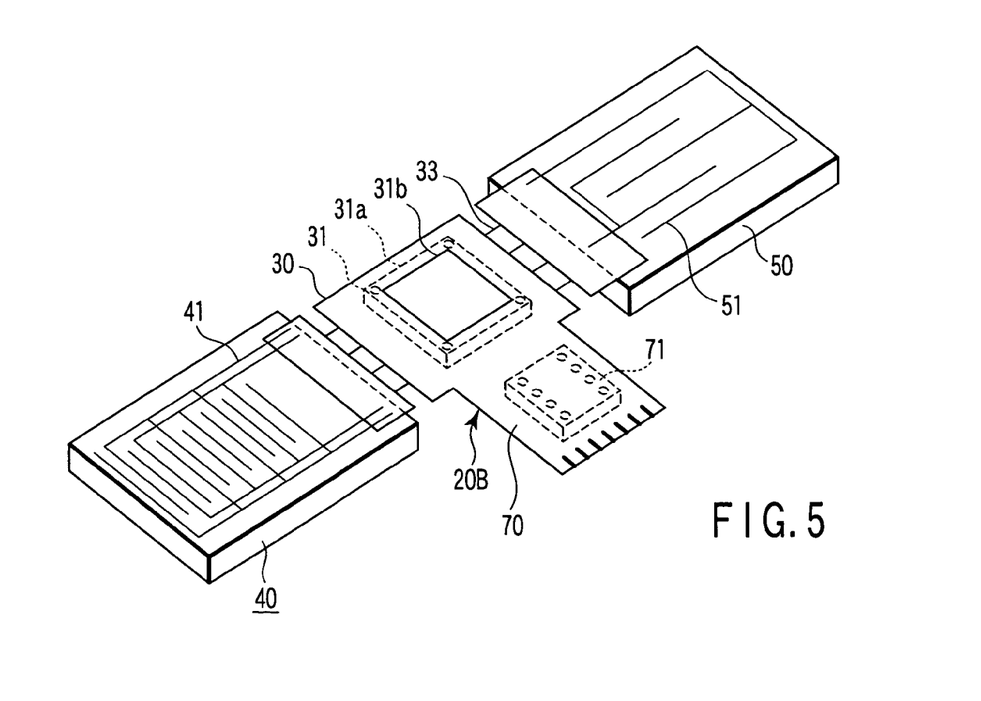
FIG. 5 is a perspective view showing a soft substrate assembled in a camera unit according to a second embodiment of the present invention.

FIG. 5 is a perspective view showing a soft substrate 20B assembled in a camera unit 10 according to a second embodiment of the present invention. The same reference numerals as those used in FIG. 3 are used to denote the same functional parts used in FIG. 5, and the detailed description thereof is omitted. In this embodiment, an image pickup device region 30 and a switching device region 70 are formed on the soft substrate 20B, and a switching device 71 is disposed on the switching device region 70.

Figure 6:
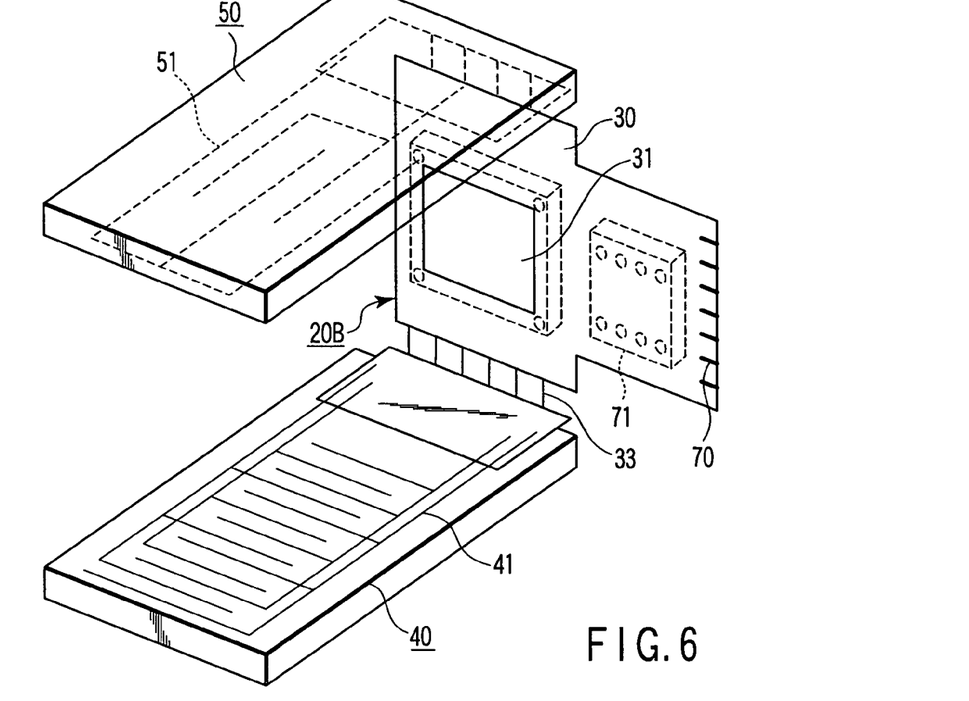
FIG. 6 is a perspective view showing a bent state of the soft substrate.

The camera unit 10 can be manufactured similarly that shown in FIG. 2 described above by bending the soft substrate 20B as shown in FIG. 6 in assembly.

According to the camera unit 10 of the second embodiment, the same effect as that of the camera unit of the first embodiment can be obtained. Moreover, since the switching device 71 can be mounted on the soft substrate 20B without providing a different substrate on which it is mounted, it is possible to reduce the size of the camera unit, in addition to the effect of improving EMC.

Figure 7:
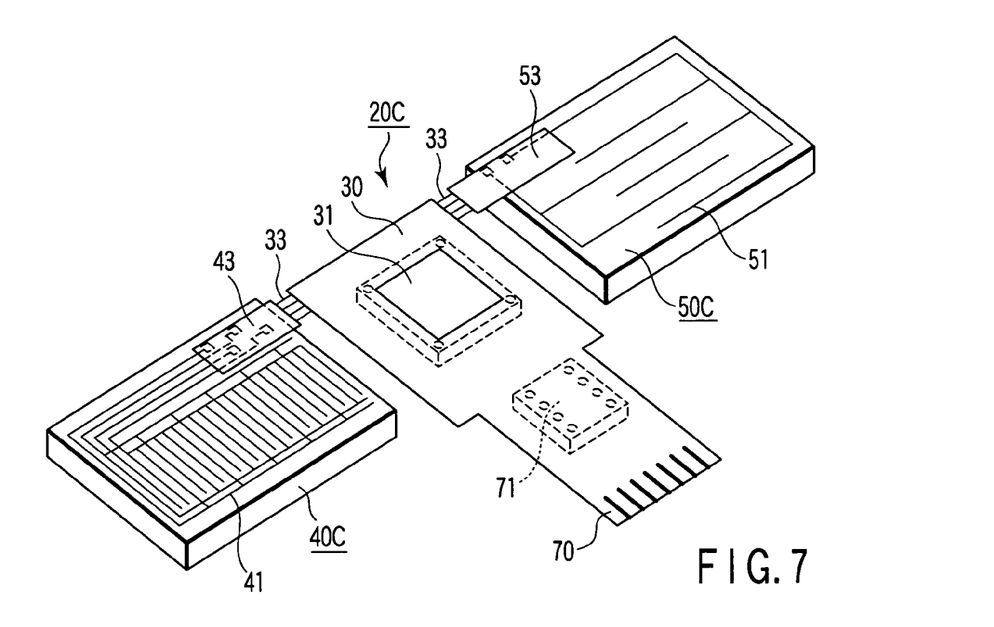
FIG. 7 is a perspective view showing a soft substrate assembled in a camera unit according to a third embodiment of the present invention.

FIG. 7 is a perspective view showing a soft substrate 20C assembled in a camera unit 10 according to a third embodiment of the present invention. The same reference numerals as those used in FIG. 5 are used to denote the same functional parts used in FIG. 7, and the detailed description thereof is omitted. In this embodiment, an image pickup device region 30 and a switching device region 70 are formed on the soft substrate 20C, and a switching device 71 is disposed on the switching device region 70.

Connecting pad portions 43 and 53 for connecting the image pickup device region 30 to electrode regions 40 and 50 are disposed in a direction perpendicular an optical axis direction along which the comb-shaped electrodes of a driving electrode group 41 and a holding electrode group 51 are arranged. Accordingly, when compared with the camera unit of FIG. 5, it is possible to dispose a movable unit 60 nearer to an image pickup device 31 by the size of the connecting pad portions 43 and 53, thereby the moving range of the movable unit 60 can be increased and the height of the camera unit can be reduced.

The camera unit 10 can be manufactured similarly that shown in FIG. 2 described above by bending the soft substrate 20C similarly to that shown in FIG. 6 in assembly.

According to the camera unit 10 of the third embodiment, the same effect as that of the camera unit of the second embodiment as well as the moving ranges of the movable unit 60 and a movable unit 61 can be increased and the height of the camera unit can be reduced in its entirety.

Figure 8:
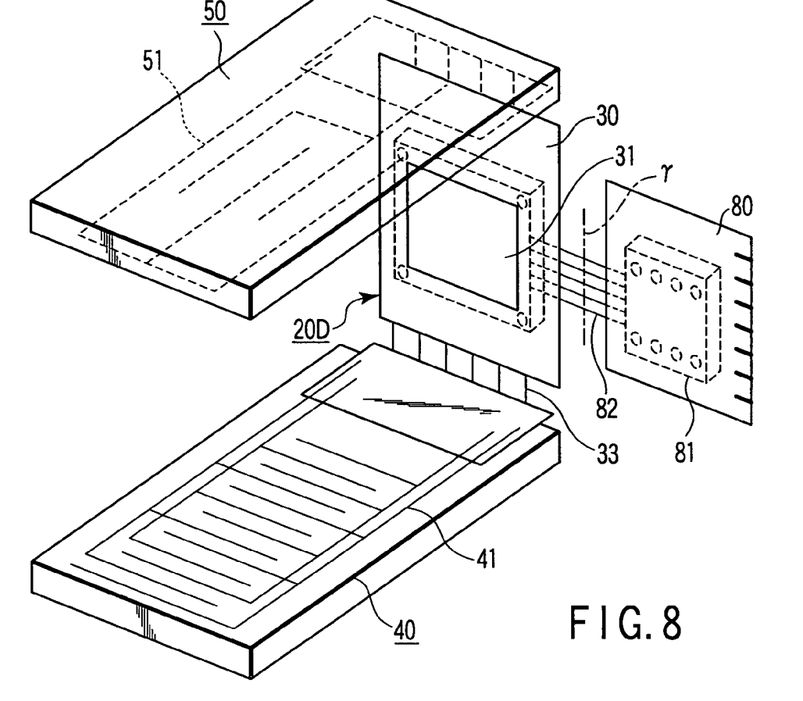
FIG. 8 is a perspective view showing a bent state of a soft substrate assembled in a camera unit according to a fourth embodiment of the present invention.

FIG. 8 is a perspective view showing a soft substrate 20D assembled in a camera unit 10 according to a fourth embodiment of the present invention. In this embodiment, an image pickup device region 30 is formed on the soft substrate 20D. A switching device substrate 80 is disposed adjacent to the soft substrate 20D. A switching device 81 is disposed on the switching device substrate 80 and connected to an image pickup device 31 through flying leads 82. Note that, a two-dot-and-dash-line γ in FIG. 8 shows a bending position.

The camera unit 10 can be manufactured similarly that shown in FIG. 2 described above by bending the soft substrate 20D as shown in FIG. 8 in assembly and further bending it at the bending position γ.

According to the camera unit of the fourth embodiment, the same effect as that of the camera unit of the second embodiment can be obtained. Further, since the switching device substrate 80 can be bent along a stationary unit frame 11, it is possible to reduce the size of the soft substrate 20D, thereby the size of the camera unit can be more reduced.

Figure 9:
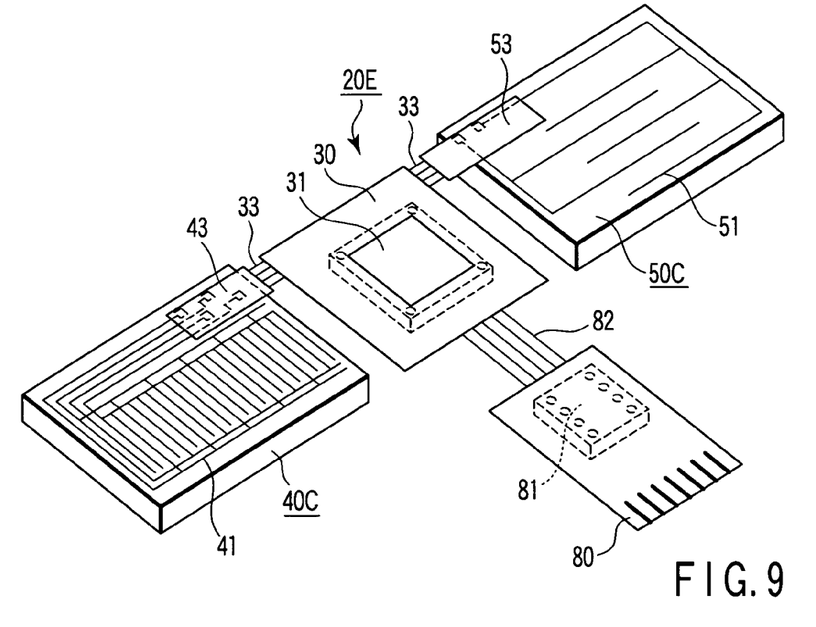
FIG. 9 is a perspective view showing a soft substrate assembled in a camera unit according to a fifth embodiment of the present invention.

FIG. 9 is a perspective view showing a soft substrate 20E assembled in a camera unit 10 according to a fifth embodiment of the present invention. The same reference numerals as those used in FIG. 8 are used to denote the same functional parts used in FIG. 9, and the detailed description thereof is omitted. In this embodiment, a switching device substrate 80 is disposed adjacent to the soft substrate 20E. A switching device 81 is disposed on the switching device substrate 80 and connected to an image pickup device 31 through flying leads 82.

Further, connecting pad portions 43 and 53 for connecting an image pickup device region 30 to electrode regions 40 and 50 are disposed in a direction perpendicular an optical axis direction along which the comb-shaped electrodes of a driving electrode group 41 and a holding electrode group 51 are arranged. Accordingly, when compared with the camera unit of FIG. 8, it is possible to dispose a movable unit 60 nearer to an image pickup device 31 by the size of the connecting pad portions 43 and 53, thereby the moving range of the movable unit 60 can be increased and the height of the camera unit can be reduced.

The camera unit 10 can be manufactured similarly that shown in FIG. 2 described above by bending the soft substrate 20E similarly to that shown in FIG. 8 in assembly.

According to the camera unit of the fifth embodiment, the same effect as that of the camera unit of the fourth embodiment can be obtained as well as the moving ranges of movable unit 60 and 61 can be increased and the height of the camera unit can be reduced in its entirety.

It should be noted that the present invention is by no means limited to the above embodiments. That is, although the above embodiments have been explained using a CMOS sensor as the image pickup device, the present invention is not limited to the CMOS sensor and other image pickup devices such as a CCD sensor and the like may be employed. Although the flying leads are disposed in a part of the soft substrate by removing a film therefrom, cutouts or hole portions may be formed in place of entirely removing the film.

The projections of the stationary unit frame are by no means limited to the shape described above and projecting portions and recessed portions may be inverted as long as such an arrangement can support the mechanical positioning between the stationary unit frame and the soft substrate. Furthermore, the projections may be formed in the periphery of the stationary unit frame. It goes without saying that various modifications can be made within the range which does not depart from the gist of the present invention, in addition to the above-mentioned arrangements.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera unit comprising:
   a flexible substrate including at least an electrode region and an image pickup device region formed on the same surface thereof;
   a driving electrode portion disposed on the electrode region and including a plurality of electrodes arranged along a predetermined direction;
   an image pickup device disposed on the image pickup device region on the flexible substrate;
   stationary unit attaching portions disposed on the flexible substrate at positions surrounding the image pickup device region;
   a stationary unit frame which is attached to the stationary unit attaching portions by engaging with engagement sites provided at the stationary unit attaching portions, and extended in the predetermined direction; and
   movable units which are reciprocatingly driven in the stationary unit frame in the predetermined direction by the driving electrode portion and support a lens respectively,
   wherein the flexible substrate is bent along a bending portion between the electrode region and the image pickup device region, the electrode region is engaged with an engagement site provided on a side of the stationary unit frame so as to be fixed inwardly thereof, and the image pickup device region is fixed on an end surface of the stationary unit frame toward the movable units.

2. A camera unit according to claim 1, wherein the flexible substrate further comprises an electrode part mounting region disposed adjacent to the image pickup device region and bent along a bending portion between the image pickup device region and the electrode part mounting region, and the electrode part mounting region is fixed on a side of the stationary unit frame inwardly thereof.

3. A camera unit according to claim 1, wherein the flexible substrate comprises a resin sheet and metal leads, and at least a part of the resin sheet is cut off at the bending portion.

4. A camera unit according to claim 1, wherein a driver which generates a driving high voltage applied to the driving electrode portion is disposed in the vicinity of the electrode region.

5. A camera unit according to claim 4, wherein the driver is disposed at a position along a direction perpendicular to the predetermined direction with respect to the electrode region.

6. A method of manufacturing a camera unit comprising a stationary unit and movable units which are reciprocatingly driven in the stationary unit along a predetermined direction and support a lens respectively, the stationary unit comprising a flexible substrate including at least an electrode region, on which a driving electrode portion is mounted, and an image pickup device region, on which an image pickup device and a stationary unit frame are mounted, on the same surface thereof of the flexible substrate, the method comprising:
   attaching the stationary unit frame to the image pickup device region by engaging the stationary unit frame with engagement sites disposed on the flexible substrate at positions surrounding the image pickup device region;
   bending the flexible substrate along a bending portion between the electrode region and the image pickup device region;
   engaging the electrode region with an engagement site provided on a side of the stationary unit frame so as to fix the electrode region inwardly thereof; and
   fixing the image pickup device region on the end surface of the stationary unit frame toward the movable units.

\* \* \* \* \*